United States Patent
Nakatsuhama et al.

(10) Patent No.: US 7,149,830 B2
(45) Date of Patent: Dec. 12, 2006

(54) SEMICONDUCTOR DEVICE AND MICROCONTROLLER

(75) Inventors: Norihiro Nakatsuhama, Kawasaki (JP); Yoshiaki Nagatomi, Kawasaki (JP); Kenichi Kawabata, Kawasaki (JP); Tomohide Yamamoto, Kawasaki (JP); Kenji Nakata, Yokohama (JP); Hironori Aono, Yokohama (JP); Masatoshi Konishi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 10/947,538

(22) Filed: Sep. 23, 2004

(65) Prior Publication Data

US 2005/0188141 A1  Aug. 25, 2005

(30) Foreign Application Priority Data

Feb. 25, 2004  (JP) .............................. 2004-050023

(51) Int. Cl.
*G06F 13/24* (2006.01)
(52) U.S. Cl. .................. 710/260; 710/48; 710/266
(58) Field of Classification Search ................ 710/260, 710/266, 48
See application file for complete search history.

(56) References Cited

U.S. PATENT DOCUMENTS

| | | | | |
|---|---|---|---|---|
| 4,761,762 A | * | 8/1988 | Holmes ....................... 710/260 |
| 4,833,598 A | * | 5/1989 | Imamura et al. ............. 710/260 |
| 5,548,762 A | * | 8/1996 | Creedon et al. ............. 710/260 |
| 5,581,771 A | | 12/1996 | Osakabe ...................... 395/738 |
| 5,875,108 A | * | 2/1999 | Hoffberg et al. ............... 700/17 |
| 5,905,897 A | * | 5/1999 | Chou et al. .................. 710/260 |
| 5,913,045 A | * | 6/1999 | Gillespie et al. ............. 710/311 |
| 2003/0145147 A1 | * | 7/2003 | Alexander et al. .......... 710/260 |

OTHER PUBLICATIONS

Dandamudi, Sivarama P. Fundamentals of Computer Organization and Design. Spring-Verlag New York, Inc. 2003.*

* cited by examiner

*Primary Examiner*—Mark H. Rinehart
*Assistant Examiner*—Matthew Spittle
(74) *Attorney, Agent, or Firm*—Staas & Halsey LLP.

(57) ABSTRACT

A semiconductor device in which input terminals for external interrupts can be set as desired. A plurality of external input terminals can be specified as interrupt terminals which output an input signal to an external interrupt circuit via an interrupt terminal selector. A selection control circuit specifies whether a plurality of external input terminals are used as interrupt terminals. According to the selection control circuit, the interrupt terminal selector outputs to the external interrupt circuit an input signal entered from an external input terminal which is specified as an interrupt terminal out of the plurality of external input terminals.

12 Claims, 5 Drawing Sheets

SEMICONDUCTOR DEVICE AND MICROCONTROLLER

CROSS-REFERENCE TO RELATED APPLICATIONS

This application is based upon and claims the benefits of priority from the prior Japanese Patent Application No. 2004-050023, filed on Feb. 25, 2004, the entire contents of which are incorporated herein by reference.

BACKGROUND OF THE INVENTION (1) Field of the Invention

This invention relates to a semiconductor device and a microcontroller and, in particular, to a semiconductor having prescribed terminals to receive external signals, for generating an interrupt signal based on an external signal, and a microcontroller for performing a process according to the interrupt signal.

(2) Description of the Related Art

In general, semiconductor devices generate interrupts in central processing units (CPU) according to waveforms received via external terminals. This function is realized by a dedicated external interrupt circuit and external input terminal in pairs. To flexibly match systems, a plurality of such pairs is provided.

Figure 5:
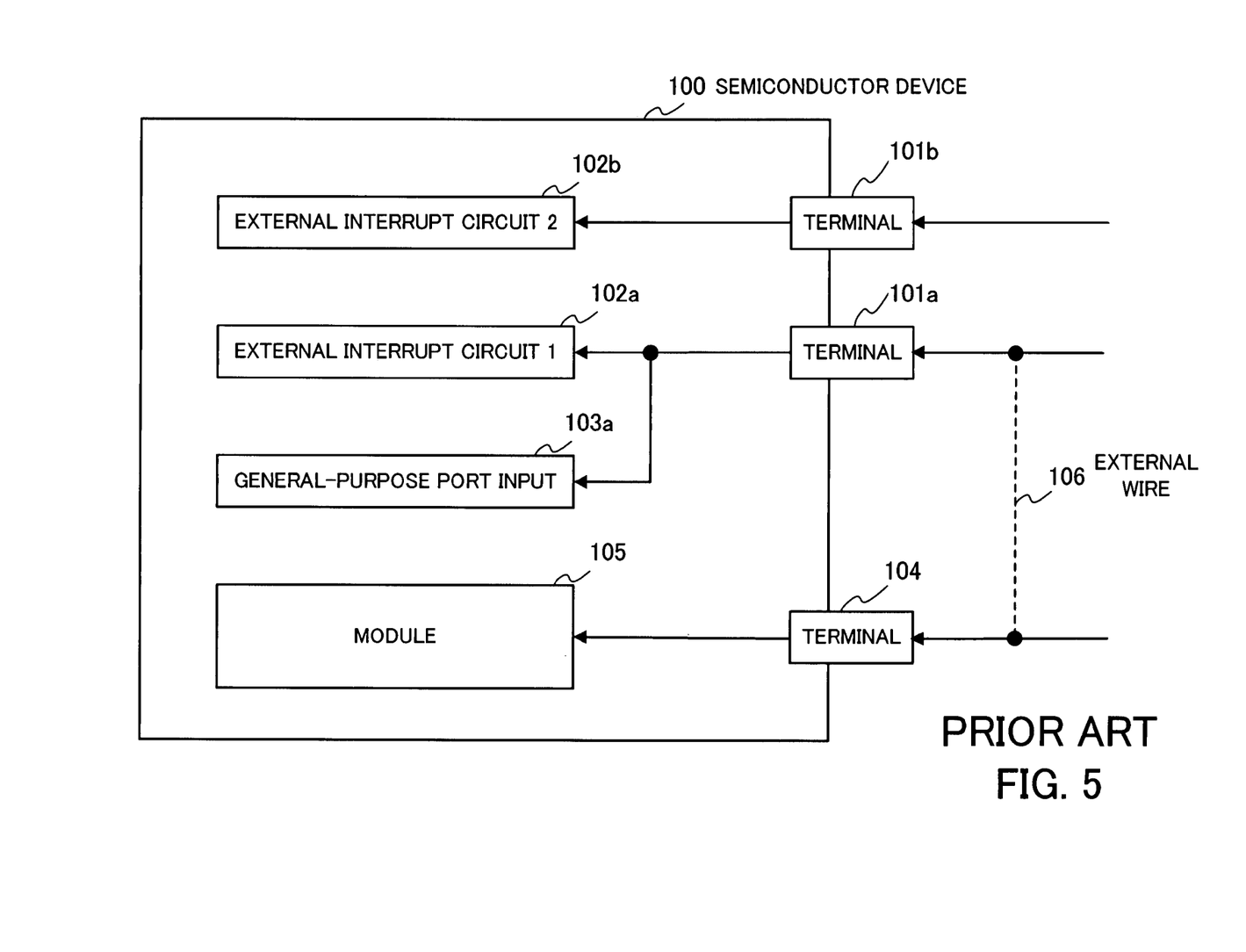
FIG. 5 shows a construction of a conventional semiconductor device.

FIG. 5 shows a construction of a conventional semiconductor device. This semiconductor device 100 is provided with external interrupt terminals 101a and 101b for receiving external interrupt signals, external interrupt circuits 1 (102a) and 2 (102b) connected to the external interrupt terminals 101a and 101b, respectively, for performing processes according to the external interrupt signals received via the terminals, and a general-purpose port input 103a for detecting the state of the external interrupt terminal 101a being connected thereto. Other than the external interrupt terminals 101a and 101b, a general-purpose input terminal 104 and a module 105 for processing a signal received from the general-purpose input terminal 104 are provided. When each external interrupt circuit 1 (102a), 2 (102b) detects change in the waveform (edge or change in level) of a signal being connected to the corresponding external interrupt terminal 101a, 101b, it outputs an interrupt signal to a CPU.

In the conventional semiconductor device 100, the connection of an external interrupt circuit and an external interrupt terminal is fixed. To cause an external interrupt, an external interrupt signal has to be connected to one of the external interrupt terminals 101a and 101b. For example, in a case of using an external signal to be entered to the module 105, as an external interrupt signal triggering an event, this signal is connected to not only the input terminal 104 but also to the external interrupt terminal 101a by using an external wire 106.

Recently, a microcomputer has been proposed, in which the connection of an external interrupt terminal and an external interrupt circuit is not fixed but the connection of an interrupt request signal output from an external interrupt terminal and an interrupt control circuit for performing an interrupt process is changeable (for example, refer to Japanese Unexamined Patent Application No. 7-105175 (Paragraphs [0016]–[0023], and FIG. 1)).

SUMMARY OF THE INVENTION

This invention proposes a semiconductor device provided with prescribed terminals to receive external signals, which generates an interrupt signal based on an external signal. This semiconductor device comprises: a selection control unit for specifying external input terminals to be used as interrupt terminals, out of a plurality of external input terminals; a selection unit connected to the plurality of external input terminals, for selecting the external input terminals specified as the interrupt terminals by the selection control unit and outputting an external signal entered from the external input terminal selected; and an interrupt control unit for generating an interrupt signal based on the waveform of the external signal output from the interrupt terminal selected by the selection unit.

Further, this invention proposes a microcontroller provided with prescribed terminals to receive external signals, which generates an interrupt signal based on an external signal and performs a process according to the interrupt signal. This microcontroller comprises: a selection control unit for specifying external input terminals to be used as interrupt terminals out of a plurality of external input terminals; a selection unit connected to the plurality of external input terminals, for selecting the external input terminals specified as the interrupt terminals by the selection control unit and outputting an external signal entered from the external input terminal selected, and an interrupt control unit for generating an interrupt signal based on the waveform of the external signal output from the interrupt terminal selected by the selection unit and outputting the interrupt signal to a central processing unit for performing a process according to the interrupt signal.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

Conventional semiconductor devices have an inflexibility problem because external interrupt terminals are fixed.

As described with reference to FIG. 5, the conventional semiconductor device has drawbacks in which external interrupt terminals are used as only input terminals for external interrupts and the external interrupt terminals and external interrupt circuits are always provided in pairs. In other words, general input terminals cannot be used as external interrupt terminals. Therefore, a sufficient number of pairs of external interrupt terminals and external interrupt circuits should be arranged in a semiconductor device, which results in enlarging the scale of the device. Further, if some external interrupt terminals are not used, the external interrupt terminals and their mating interrupt circuits are useless.

Furthermore, since the positions of the external interrupt terminals are also fixed, the system structure becomes complex when an interrupt signal is connected to an external interrupt terminal. For example, in a case where an output signal of another semiconductor device is used as an external interrupt signal, a long external wire may be prepared to connect the output terminal for this output signal and an external interrupt terminal, depending on the positions of the terminals.

Furthermore, in a case where the external interrupt function is operated with another function to make an event trigger, an external interrupt terminal and another terminal should be connected by an external wire on the system. Therefore, the terminal which can be usually used as a general-purpose port becomes unusable.

On the other hand, in a microcomputer with changeable connections of external interrupt terminals and interrupt control circuits having different priorities, a priority order of interrupts can be set as desired by changing the connections. However, external interrupt signals have to be entered to external interrupt terminals. Therefore, in a case where an input signal to be connected to a general-purpose module is used as an interrupt signal, this input signal has to be connected to an external interrupt terminal with an external wire, similarly to the conventional semiconductor device.

This invention has been made in view of foregoing and provides a semiconductor device and a microcontroller in which input terminals can be set as external interrupt terminals as desired.

A preferred embodiment of this invention will be described with reference to the accompanying drawings. This first describes a concept of this invention implemented to the embodiment and then a specific embodiment.

Figure 1:
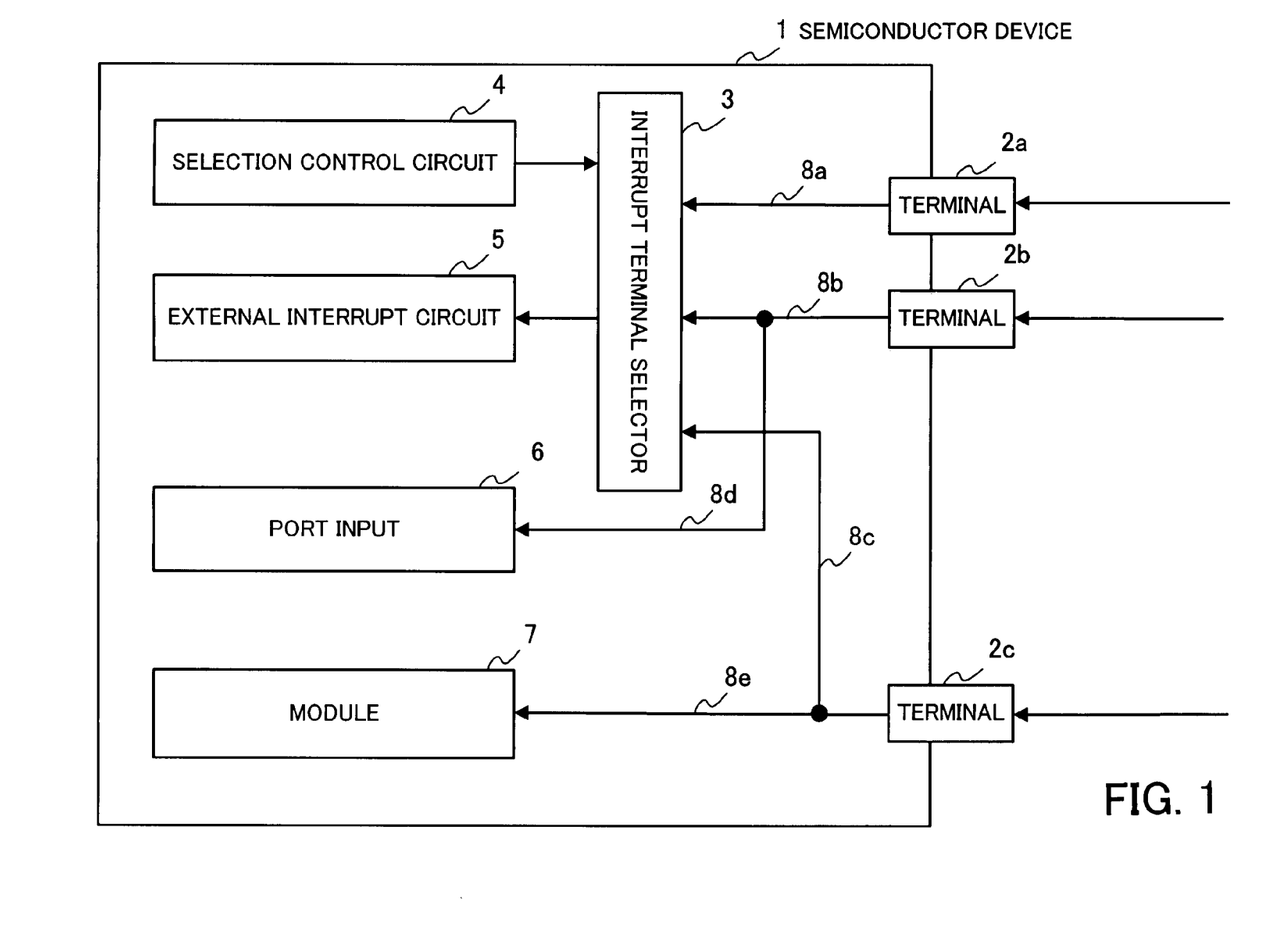
FIG. 1 shows a construction of a semiconductor device according to one embodiment of this invention.

FIG. 1 shows a construction of a semiconductor of this embodiment of this invention.

This semiconductor device 1 is composed of external input terminals 2a, 2b, and 2c, an interrupt terminal selector 3 for selectively outputting an external signal received from an external input terminal 2a, 2b, 2c, a selection control circuit 4 for specifying a terminal as an interrupt terminal out of the external input terminals 2a, 2b and 2c, an external interrupt circuit 5 for generating an interrupt signal based on the signal selectively output from the interrupt terminal selector 3, a port input 6 for detecting the state of the external input terminal 2b, and a module 7 for performing a prescribed signal process with an external signal received from the external input terminal 2c.

External signals generated outside the semiconductor device 1 are connected to the external input terminals 2a, 2b and 2c, and entered into the semiconductor device 1 via the terminals 2a, 2b and 2c. The external input terminals 2a, 2b, and 2c are connected to the interrupt terminal selector 3 with signal lines 8a, 8b and 8c, respectively, to enter received external signals to the interrupt terminal selector 3. In addition, in this figure, the external input terminal 2b is also connected to the port input 6 with a signal line 8d and the external input terminal 2c is connected to the module 7 with a signal line 8e. Circuit connections other than connections to the interrupt terminal selector 3 can be made as desired. For example, the external input terminal 2a may be connected to the port input 6 or the module 7.

The interrupt terminal selector 3 is a selector for selectively outputting an external signal received from an external input terminal 2a, 2b, 2c which is specified as an interrupt terminal out of the connecting external input terminals 2a, 2b and 2c, to the external interrupt circuit 5 under the control of the selection control circuit 4. The interrupt terminal selector 3 comprises, for example, a switching circuit or a masking circuit, the switching circuit capable of switching the connections between the input signal lines 8a, 8b and 8c and an output signal line connected with the external interrupt circuit 5, the masking circuit capable of making effective only an external signal received from an external input terminal specified as an interrupt terminal, out of the external signals received from the external input terminals 2a, 2b and 2c. Note that a plurality of external input terminals can be specified as interrupt terminals. In this case, a signal derived from a logical OR of the external signals from the specified external input terminals is output to the external interrupt circuit 5.

The selection control circuit 4 is a selection control unit for instructing the interrupt terminal selector 3 to select an external input terminal 2a, 2b, 2c as an interrupt terminal. This circuit 4 is, for example, a storage unit for storing for each external input terminal 2a, 2b, 2c specification information specifying whether an external input terminal 2a, 2b, 2c is to be used as an interrupt terminal, and is accessible by the interrupt terminal selector 3. In addition, the specification information is readable and changeable from outside.

The external interrupt circuit 5 monitors the waveform of a selected output signal output from the interrupt terminal selector 3, and generates an interrupt signal when detecting a prescribed waveform. An interrupt signal is produced when preset conditions are satisfied, for example, when an edge or change in level of a waveform is detected. As described above, the selected output signal of the interrupt terminal selector 3 is derived from a logical OR of external signals output from external input terminals specified as interrupt terminals. Since the signals of some external input terminals can be processed together as described above, fewer external interrupt circuits 5 than external input terminals are sufficient in the semiconductor device 1.

The input 6 detects the signal state of an external signal received from the connecting external input terminal 2b. Since a signal derived from a logical OR of external signals output from interrupt terminals can be entered to the external interrupt circuit 5, the port input 6 is designed to be able to, for example, confirm the state of the received external signal and determine which external signal causes an interrupt, according to necessity, at the time of an interrupt process.

The module 7 is a signal processor for receiving an external signal from the external input terminal 2c and performing a prescribed signal process.

The operation of such semiconductor device 1 will be now described.

The semiconductor device 1 takes in external signals via the external input terminals 2a, 2b and 2c and performs prescribed processes. Information specifying which terminals out of the external input terminals 2a, 2b and 2c are to be used as interrupt terminals is previously stored in the selection control circuit 4. This information is readable and changeable when necessary.

The external signals from the external input terminals 2a, 2b and 2c are entered into the interrupt terminal selector 3 via the signal lines 8a, 8b and 8c, respectively. The module 7 performs a prescribed signal process with an external signal received from the external input terminal 2c via the signal line 8e. The external signal from the external input terminal 2b is also entered to the port input 6 through the signal line 8d, so that the input 6 detects the state of this signal. In this way, the external signals from the external input terminals 2a, 2b and 2c can be used simultaneously by other functions.

The interrupt terminal selector 3 selects the external signal from an external input terminal specified as an interrupt terminal out of the external input terminals 2a, 2b and 2c, under the control of the selection control circuit 4, and outputs the selected external signal to the external interrupt circuit 5. In a case where a plurality of external input terminals are specified as interrupt terminals, a signal derived from a logical OR of the external signals therefrom is entered into the external interrupt circuit 5.

The external interrupt circuit 5 generates an interrupt signal according to the waveform of a selected output signal (a signal derived from a logical OR of the external signals from the interrupt terminals) from the interrupt terminal selector 3.

According to this semiconductor device 1, the selection control circuit 4 can be used to specify external input terminals as interrupt terminals out of the plurality of external input terminals 2a, 2b, and 2c connected to the interrupt terminal selector 3. In addition, external terminals which are not specified as interrupt terminals can be used as general-purpose external input terminals. Since external input terminals can be set as interrupt terminals according to a system as described above, an optimal system board can be designed. In addition, external input terminals which are not specified as interrupt terminals can be used as general-purpose input terminals, so that terminals can be effectively used.

Further, since the interrupt terminal selector 3 outputs a signal derived from a logical OR of external signals to the external interrupt circuit 5 when a plurality of interrupt terminals are specified, fewer external interrupt circuits 5 than external input terminals are sufficient. Comparing with the conventional case where external interrupt terminals and external interrupt circuits are provided in pairs, the number of external interrupt circuits can be reduced, resulting in realizing a smaller device. To determine which external signal is used to generate an interrupt signal, a processor for executing the interrupt process uses the general-purpose port input 6 to confirm the signal state.

Furthermore, by using signal lines such as the signal lines 8c and 8e, an external input terminal is connected to the interrupt terminal selector 3 and to the general-purpose module 7. Therefore, a new connection of an interrupt terminal to a general-purpose input terminal on the system board is not required for operating the external interrupt function with another function. As a result, the system board can be simplified and, in addition, useless terminals do not exist because terminals can be used for multipurpose.

Figure 2:
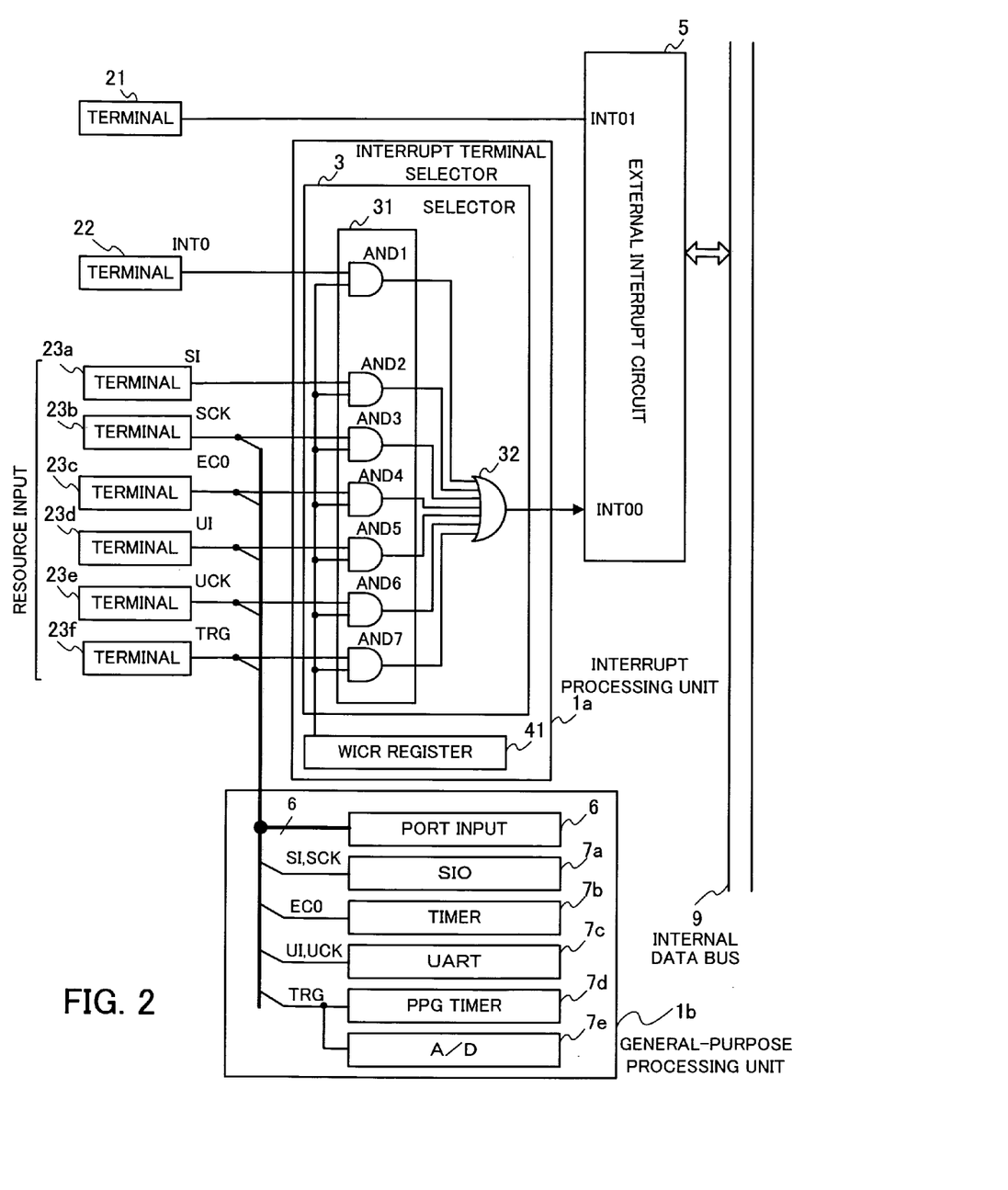
FIG. 2 is a block diagram showing the semiconductor device according to the embodiment of this invention.

A specific circuit construction of a semiconductor device according to the embodiment of this invention will be now described. FIG. 2 is a block diagram of this semiconductor device, in which the same reference numerals are applied to parts corresponding to those of FIG. 1. Explanation of the parts with the same reference numerals will be omitted.

The semiconductor device 1 according to this invention is composed of a plurality of external input terminals, an interrupt processing unit 1a for selectively outputting an external signal from an external input terminal, and a general-purpose processing unit 1b for performing prescribed general-purpose processes with external signals.

The external input terminals include an external interrupt terminal 21 for only external interrupts, an external interrupt terminal 22 for external interrupts which can be made usable or unusable selectively, and resource input terminals 23a, 23b, 23c, 23d, 23e, and 23f which are shared by other general-purpose modules.

The external interrupt terminal 21 is a dedicated external interrupt terminal, and directly enters a received external signal into an INT01 terminal of an external interrupt circuit 5.

The external interrupt terminal (hereinafter, referred to INT0 terminal) 22 is an external interrupt terminal which can be made usable or unusable selectively, and is connected to an interrupt terminal selector 3. When this terminal 22 is specified as an interrupt terminal, its external signal is output to the external interrupt circuit 5 via the interrupt terminal selector 3.

The resource input terminals 23a, 23b, 23c, 23d, 23e and 23f are external input terminals which are shared by the external interrupt function and general-purpose functions. These terminals are connected to the interrupt terminal selector 3 and also to corresponding general-purpose modules, which allows external signals to be used simultaneously. In the example of this figure, the resource input terminals include a UI terminal (23d) which is a data input terminal of a universal asynchronous receiver/transmitter (UART), a UCK terminal (23e) which is a clock input/output terminal of UART, an EC0 terminal (23c) which is an event input terminal, an SI terminal (23a) which is a data input terminal for serial input/output (SIO), an SCK terminal (23b) which is a clock input/output terminal for SIO, and a TRG terminal (23f) which is a trigger input terminal for a program timer and A/D converter. The role of each terminal is not described here because it does not relate to the purpose of explanation of this invention.

The interrupt processing unit 1a is composed of the interrupt terminal selector 3 and a WICR register 41 serving as an interrupt control circuit.

The interrupt terminal selector 3 is composed of a selector 31 for selecting external signals under the control of the WICR register 41 and an OR circuit 32 for performing a logical OR operation on selected output signals from the selector 31. The selector 31 is composed of AND circuits for performing a logical AND operation on an external signal entered from a corresponding external input terminal and a corresponding value registered in the WICR register 41 and outputting the result. The AND circuits include an AND1 for the INT0 terminal 22, an AND2 for the SI terminal (23a), an AND3 for the SCK terminal (23b), an AND4 for the EC0 terminal (23c), an AND5 for the UI terminal (23d), an AND6 for the UCK terminal (23e), and an AND7 for the TRG terminal (23f).

Figure 3:
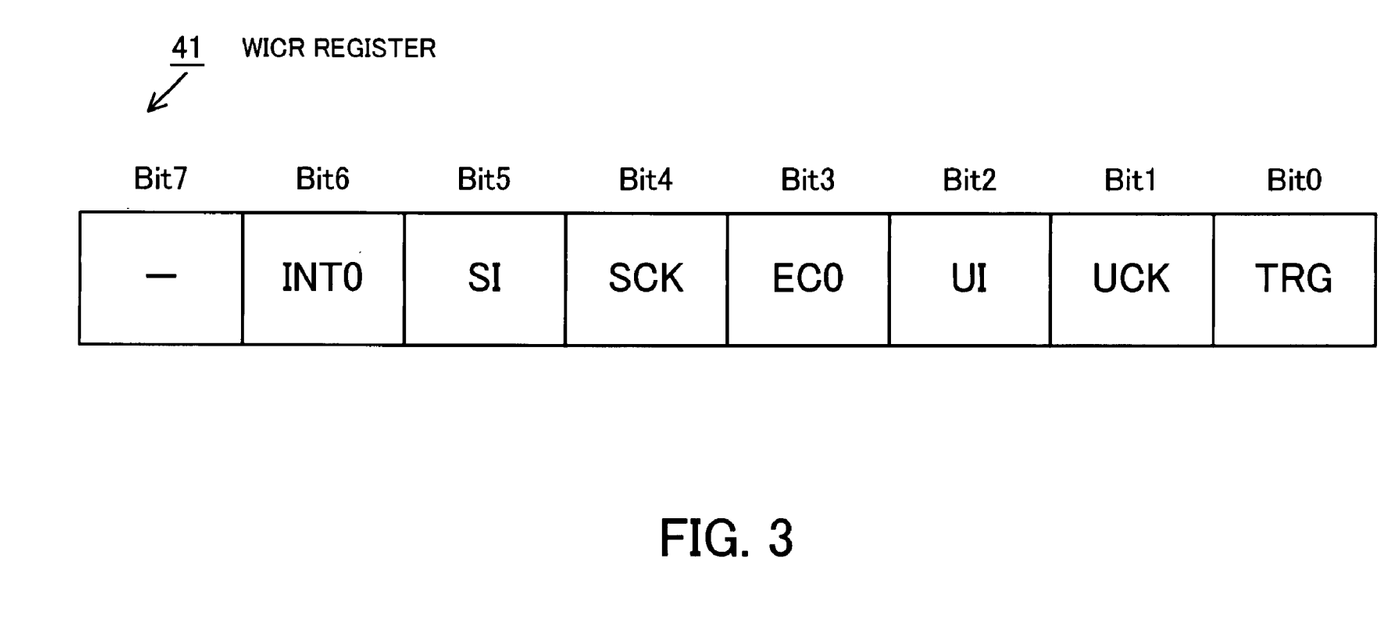
FIG. 3 shows a construction of an interrupt control register of the semiconductor device according to the embodiment of this invention.

The structure of the WICR register which is a register for interrupt control will be now described. FIG. 3 shows the structure of an interrupt control register of the semiconductor device of the embodiment of this invention.

The WICR register 41 is composed of definition bits corresponding to external input terminals. In this figure, Bit 6 corresponds to the INT0 terminal 22, Bit 5 to the SI terminal (23a), Bit 4 to the SCK terminal (23b), Bit 3 to the EC0 terminal (23c), Bit 2 to the UI terminal (23d), Bit 1 to the UCK terminal (23e), and Bit 0 to the TRG terminal (23f). Unselected (=0) or selected (=1) indicating whether a terminal is specified as an interrupt terminal is set in each bit area. Note that the WICR register 41 is readable and writable from outside via an internal data bus 9.

Back to FIG. 2.

As described above, the WICR register 41 indicates with unselected (=0)/selected (=1) whether each external input terminal is specified as an interrupt terminal. Because of the AND circuits of the selector 31, external input terminals with unselected (=0) always output "0" and external input terminals with selected (=1) always output received external signals as they are. Therefore, external signals from the external input terminals with selected (=1) are output from the selector 31. The OR circuit 32 outputs a signal derived from a logical OR of the external signals selectively output from the selector 31, to the external interrupt circuit 5.

The general-purpose processing unit 1b will be now described.

The port input 6 is connected to the SI terminal (23a), the SCK terminal (23b), the EC0 terminal (23c), the UI terminal (23d), the UCK terminal (23e), and the TRG terminal (23f), and is a port for detecting the state of an external signal entered from each of the connecting terminals.

Other general-purpose modules include an SIO 7a for performing an SIO process with signals entered from the SI terminal (23a) and the SCK terminal (23b), a timer 7b for performing a timer process with a signal entered from the EC0 terminal (23c), a UART 7c for performing a UART process with signals entered from the UI terminal (23d) and the UCK terminal (23e), and a PPG timer 7d and an A/D 7e for performing a program timer process and A/D conversion, respectively, with a signal entered from the TRG terminal (23f).

The internal data bus 9 communicates an interrupt signal generated by the external interrupt circuit 5 and read/write data from/to the WICR register 41.

The interrupt control operation of the semiconductor device will be now described.

In the WICR register 41, information (selected/unselected) specifying whether each of the INT0 terminal 22 and the resource input terminals 23a, 23b, 23c, 23d, 23e, and 23f connected to the interrupt terminal selector 3 is specified as an interrupt terminal is registered via the internal data bus 9. The selector 31 performs a logical AND operation on a corresponding value registered in the WICR register 41 and a received external signal, by accessing the WICR register 41, thereby outputting external signals entered from specified external input terminals as they are and outputting "0" for unspecified external input terminals. Therefore, only the external signals entered from external input terminals specified as interrupt terminals are selectively output. Further, the OR circuit 32 performs a logical OR operation on the external signals selectively output, and outputs the resultant to the external interrupt circuit 5. The external interrupt circuit 5 generates an interrupt signal according to the waveform of the received external signal, and sends it to the CPU through the internal data bus 9.

As described above, according to this invention, external input terminals which are used as resource input terminals can function as interrupt terminals as desired.

Note that this invention is preferably applied to microcontrollers having central processing units (hereinafter, referred to as CPU) for controlling interrupts, and application specific integrated circuits (ASIC).

Figure 4:
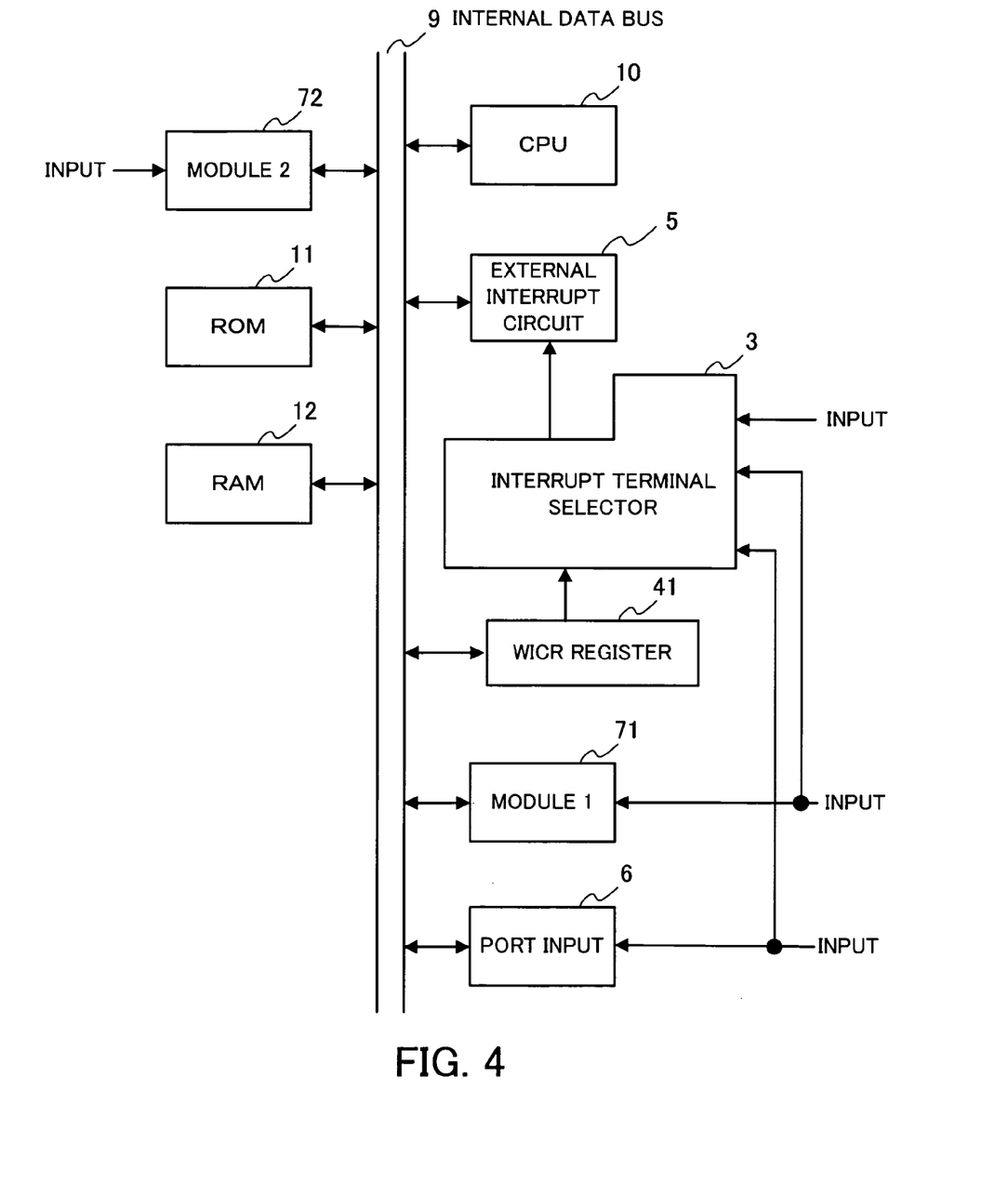
FIG. 4 shows a construction of a microcontroller according to the embodiment of this invention.

Now a case where this invention is applied to a microcontroller will be described. FIG. 4 shows a construction of the microcontroller of this invention, where the same reference numerals are applied to those of parts of FIG. 1 and FIG. 2.

The microcontroller is entirely controlled by the CPU 10. Connected to the CPU 10 via an internal data bus 9 are an interrupt terminal selector 3, a WICR register 41, an external interrupt circuit 5, a port input 6, modules 1 (71) and 2 (72) for performing general-purpose processes, a read only memory (ROM) 11, and a random access memory (RAM) 12.

The ROM 11 stores programs and application programs to be executed by the CPU 10. The RAM 12 temporarily stores at least part of the programs and application programs.

An input signal to the module 1 (71) is also used by an interrupt function, that is, can be used simultaneously by the interrupt terminal selector 3.

In such a microcontroller, when an input signal to the module 1 (71) is to be used as an input signal for an interrupt, information (selected) specifying an input terminal which enters the input signal to the module 1 (71) as an interrupt terminal is registered in the WICR register 41 under the control of the CPU 10. Then when the module 1 (71) performs a prescribed process with the input signal, the interrupt terminal selector 3 selectively outputs this input signal to the external interrupt circuit 5 according to the information registered in this WICR register 41 at the same time. The external interrupt circuit 5 generates an interrupt signal according to the waveform of the input signal shared by the module 1 (71). The interrupt signal is sent to the CPU 10 via the internal data bus 9, so that the CPU 10 executes a prescribed interrupt process.

When the input signal is not shared by the interrupt function, information (unselected) indicating that the input terminal which receives this input signal is not specified as an interrupt terminal is registered in the WICR register 41. In this case, the module 1 (71) performs a prescribed process with the input signal, but the interrupt terminal selector 3 does not selectively output this input signal, so that an interrupt signal based on this input signal is not generated.

As described above, in the microcontroller according to this invention, information indicating whether an input signal to a module is also used as an interrupt signal can be set as desired. Therefore, a system board can be designed simply, and different input terminals are not necessary for a module and for an interrupt, resulting in omitting useless terminals.

The above embodiment has described a case where an input signal is shared by a module. Even in a case where the input signal is not shared by a module, an external input terminal connected to the interrupt terminal selector 3 can be set as an interrupt terminal as desired, thus making it possible to design an optimal system board.

In the semiconductor device of this invention, an external input terminal to be used as an interrupt terminal is selected as desired, so as to generate an interrupt signal based on the external signal therefrom. Therefore, system construction to the positions of fixed external interrupt input terminals is not required, thus realizing a system board usable in unlimited designs. In addition, external input terminals can be selectively set as general input terminals or as interrupt terminals as desired, thereby omitting useless terminals.

Furthermore, in the microcomputer of this invention, a desired external input terminal can be selected to use an external signal therefrom to generate an interrupt signal which is entered in a central processing unit, thus realizing a system board usable in unlimited designs.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor device provided with prescribed terminals to receive external signals, for generating an interrupt signal based on a prescribed external signal, said semiconductor device comprising:

selection control unit for specifying at least one external input terminal to be used as an interrupt terminal out of a plurality of external input terminals;

selection unit connected to said plurality of external input terminals, for selecting said at least one external input terminal specified as said interrupt terminal by said selection control unit and outputting at least one external signal entered from said at least one external input terminal selected; and interrupt control unit for generating at least one interrupt signal according to a waveform of said at least one external signal output from at least one interrupt terminal selected by said selection unit, wherein said selection control unit is a storage unit for storing specification information specifying whether each of said plurality of external input terminals is used as an interrupt terminal, and the specification information is changeable from outside.

2. A semiconductor device provided with prescribed terminals to receive external signals, for generating an interrupt signal based on a prescribed external signal, said semiconductor device comprising:

selection control unit for specifying at least one external input terminal to be used as an interrupt terminal out of a plurality of external input terminals;

selection unit connected to said plurality of external input terminals, for selecting said at least one external input terminal specified as said interrupt terminal by said selection control unit and outputting at least one external signal entered from said at least one external input terminal selected;

interrupt control unit for generating at least one interrupt signal according to a waveform of said at least one external signal output from at least one interrupt terminal selected by said selection unit; and signal processing unit for executing a prescribed signal process with an external signal entered from an external input terminal out of said plurality of external input terminals, wherein said external input terminal is connected to said signal processing unit as well as to said selection unit.

3. The semiconductor device according to claim 1, wherein said selection unit outputs to said interrupt control unit a result of a logical OR operation of said external signals entered from said external input terminals specified as said interrupt terminals out of said plurality of external input terminals connected.

4. The semiconductor device according to claim 3, wherein a number of said interrupt control unit connected to said selection unit is fewer than a total number of said external input terminals connected to the selection unit.

5. A microcontroller provided with prescribed terminals to receive external signals, for generating an interrupt signal based on a prescribed external signal and performing a process according to the interrupt signal, said microcontroller comprising:

selection control unit for specifying at least one external input terminal to be used as an interrupt terminal out of a plurality of external input terminals;

selection unit connected to said plurality of external input terminals, for selecting said at least one external input terminal specified as said interrupt terminal by said selection control unit and outputting at least one external signal entered from said at least one external input terminal selected; and interrupt control unit for generating at least one interrupt signal according to a waveform of said at least one external signal output from at least one interrupt terminal selected by said selection unit, and outputting said at least one interrupt signal to a central processing unit for performing a process according to said at least one interrupt signal, wherein said selection control unit is a storage unit for storing specification information specifying whether each of said plurality of external input terminals is used as an interrupt terminal, and the specification information is changeable from outside.

6. A microcontroller provided with prescribed terminals to receive external signals, for generating an interrupt signal based on a prescribed external signal and performing a process according to the interrupt signal, said microcontroller comprising:

selection control unit for specifying at least one external input terminal to be used as an interrupt terminal out of a plurality of external input terminals;

selection unit connected to said plurality of external input terminals, for selecting said at least one external input terminal specified as said interrupt terminal by said selection control unit and outputting at least one external signal entered from said at least one external input terminal selected;

interrupt control unit for generating at least one interrupt signal according to a waveform of said at least one external signal output from at least one interrupt terminal selected by said selection unit, and outputting said at least one interrupt signal to a central processing unit for performing a process according to said at least one interrupt signal; and signal processing unit for executing a prescribed signal process with an external signal entered from an external input terminal out of said plurality of external input terminals, wherein said external input terminal is connected to said signal processing unit as well as to said selection unit.

7. The microcontroller according to claim 5, wherein said selection unit outputs to said interrupt control unit a result of a logical OR operation of said external signals entered from said external input terminals specified as said interrupt terminals out of said plurality of external input terminals connected.

8. The microcontroller according to claim 7, wherein a number of said interrupt control unit connected to said selection unit is fewer than a total number of said external input terminals connected to the selection unit.

9. The semiconductor device according to claim 5, wherein said selection unit outputs to said interrupt control unit a result of a logical OR operation of said external signals entered from said external input terminals specified as said interrupt terminals out of said plurality of external input terminals connected.

10. The semiconductor device according to claim 9, wherein a number of said interrupt control unit connected to said selection unit is fewer than a total number of said external input terminals connected to the selection unit.

11. The microcontroller according to claim 6, wherein said selection unit outputs to said interrupt control unit a result of a logical OR operation of said external signals entered from said external input terminals specified as said interrupt terminals out of said plurality of external input terminals connected.

12. The microcontroller according to claim 11, wherein a number of said interrupt control unit connected to said selection unit is fewer than a total number of said external input terminals connected to the selection unit.

* * * * *